United States Patent [19]

McMahan et al.

[11] Patent Number: 4,712,164
[45] Date of Patent: Dec. 8, 1987

[54] VEHICLE HEADLAMP ASSEMBLY

[75] Inventors: David R. McMahan; Leslie H. Hallgarth, both of Anderson; Gary L. Miller, Lapel, all of Ind.

[73] Assignee: General Motors Corporation, Detroit, Mich.

[21] Appl. No.: 824,197

[22] Filed: Jan. 30, 1986

[51] Int. Cl.$^4$ .................... B60Q 1/06; F16C 11/00
[52] U.S. Cl. ................................. 362/66; 403/77
[58] Field of Search .................. 362/66, 69, 63, 65, 362/70, 372, 226, 80; 74/417, 25, 606 R; 403/77

[56] References Cited

U.S. PATENT DOCUMENTS

| | | | |
|---|---|---|---|
| 2,225,980 | 12/1940 | Casson | 362/66 |
| 2,410,365 | 10/1946 | Sauer | 362/66 |
| 3,752,976 | 8/1973 | Di Salvo et al. | 240/41.6 |
| 3,823,314 | 6/1973 | Germany | 240/41.6 |
| 3,878,389 | 4/1975 | Puyplat | 240/41.35 |
| 3,932,837 | 1/1976 | Baker | 240/416 |
| 4,188,655 | 2/1980 | Tallon et al. | 362/80 |
| 4,196,459 | 4/1980 | Dick | 362/66 |
| 4,306,276 | 12/1981 | Dick | 362/66 |
| 4,318,162 | 3/1982 | Sip | 362/226 |
| 4,333,131 | 6/1982 | Hujimoto et al. | 362/372 |
| 4,524,407 | 6/1985 | Igura | 362/66 |
| 4,574,334 | 3/1986 | Igura | 362/66 |
| 4,578,740 | 3/1986 | Krizmanic | 362/66 |
| 4,607,976 | 8/1986 | Peek et al. | 403/77 |

FOREIGN PATENT DOCUMENTS 1427387 3/1976 United Kingdom .

Primary Examiner—Raymond A. Nelli
Attorney, Agent, or Firm—Edward J. Biskup

[57] ABSTRACT

A vehicle headlamp assembly includes a box-like support frame enclosing a lamp body mounted adjustably, as by support shoes slidable in slots of the frame, by rotary manipulation of threaded elements, accessible at improved locations on the frame.

2 Claims, 7 Drawing Figures

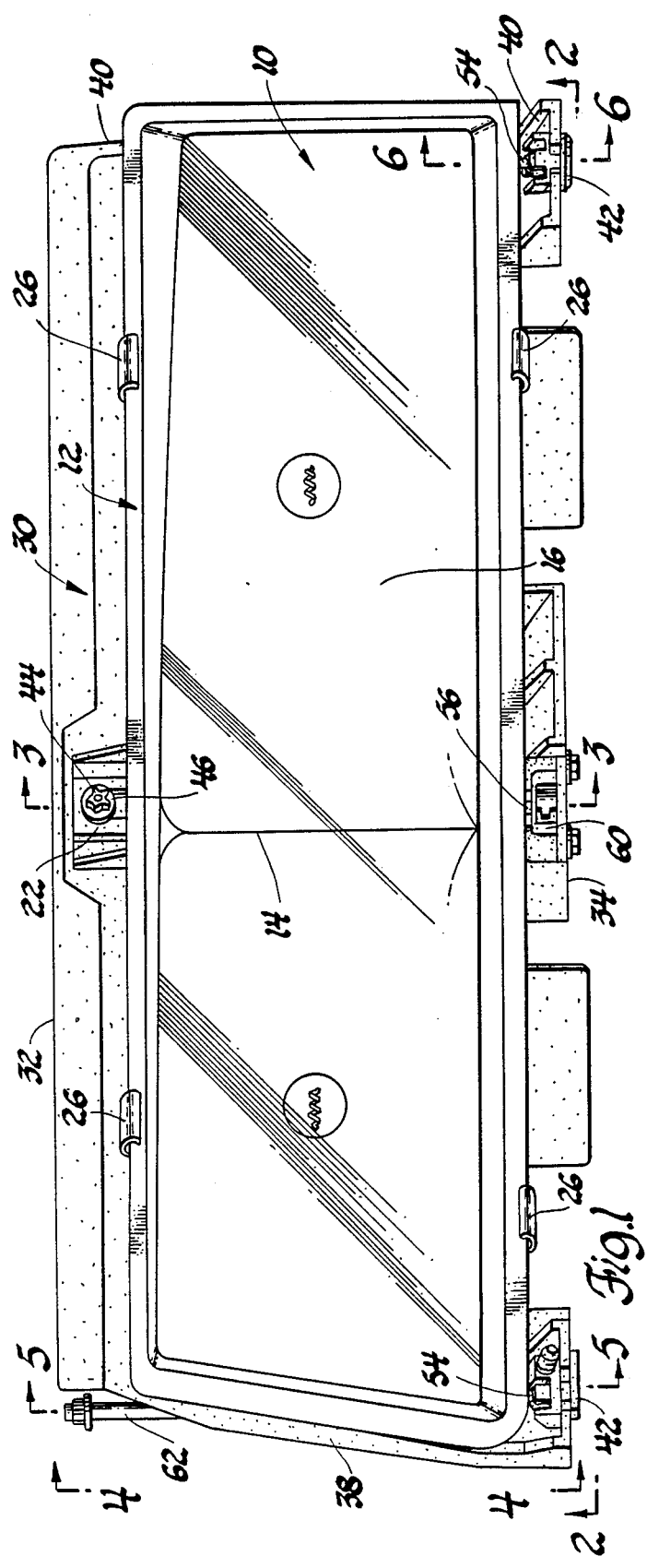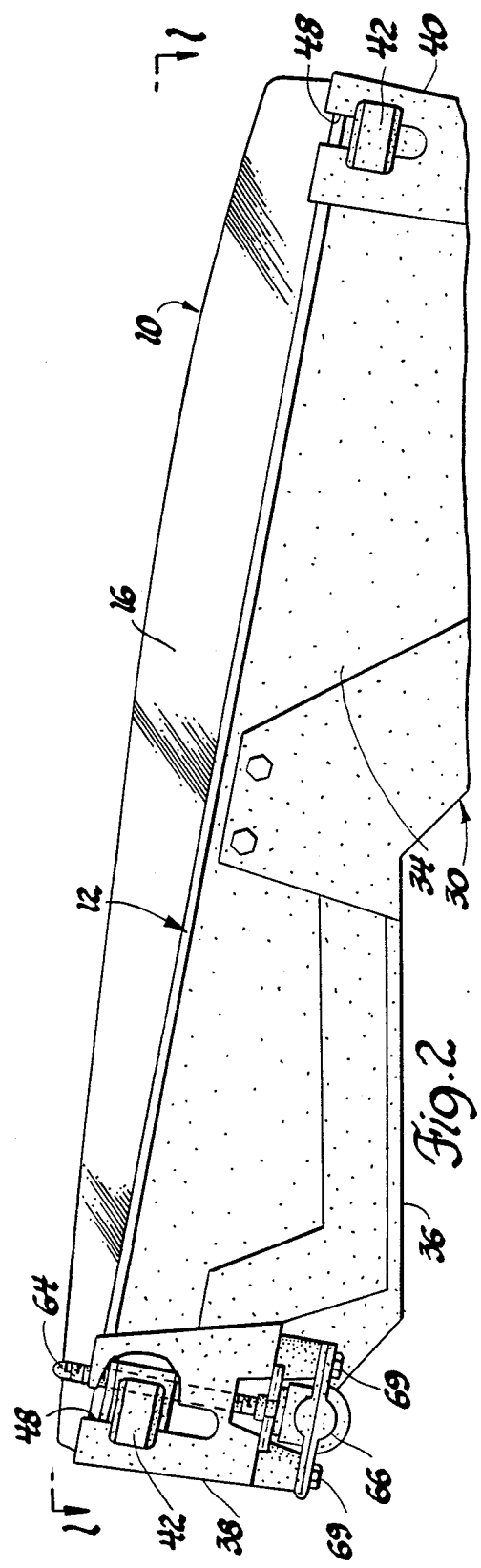

VEHICLE HEADLAMP ASSEMBLY

This invention relates to vehicle lamps and more particularly to aim-adjustable vehicle headlamps.

It is, of course, known in the prior art to provide vehicle headlamp assemblies in which the lamp may be aimed properly within the vehicle by precise manual adjustments about plural axes defined on a lamp support member of the vehicle. Typically, such adjustments are effected by small rotary manipulations of discrete threaded adjusting members spaced about the periphery of the lamp body, usually at its front exterior surface. Lately, however, with the greater and greater emphasis on the styling of these headlamp assemblies and their integration with other vehicle front panels or grilles, it is increasingly undesirable to have such adjusting members visible or even accessible at the front face of the lamp.

By the present invention, there is provided a headlamp assembly incorporating an improved adjustment arrangement in which manipulations of aiming adjusters may take place at any location about the margin of the lamp from the front, side or rear, at the selection of the designer, to satisfy whatever styling or structural concerns which may dominate.

For example, while it is also known to provide threaded adjusters manipulable from the rear of the headlamp in the engine compartment, it is often true that the crowding of internal hardware inhibits applying a hand tool onto the adjuster to satisfactorily accomplish the adjustment. The present invention features adjustment apparatus that avoids such dilemmas by enabling such interior placement of adjusters, if desired, yet with an increased flexibility of orientation suited to the convenient use of tools.

These and other objects, features and advantages of the invention will be apparent from the following specification and from the drawings wherein:

FIG. 1 is a front elevational view of a vehicle headlamp assembly according to the invention;

FIG. 2 is a bottom view, partially broken away, taken along the plane indicated 2—2 in FIG. 1;

Figure 3:
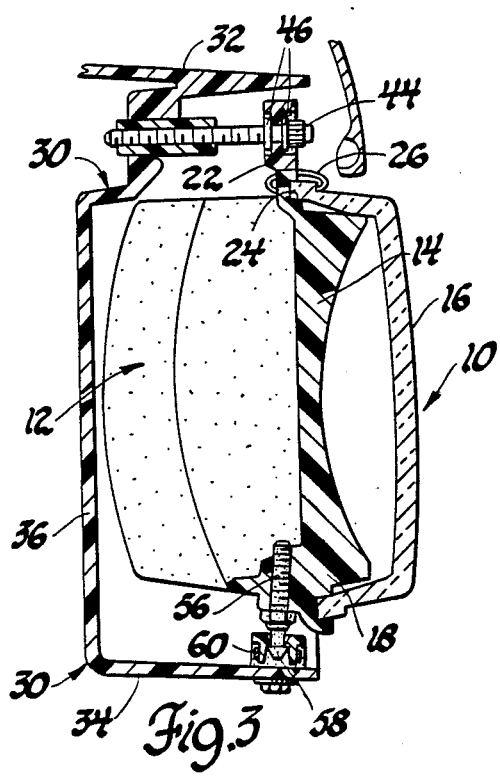
FIG. 3 is a sectional view taken along the plane indicated 3—3 in FIG. 1.
Figure 4:
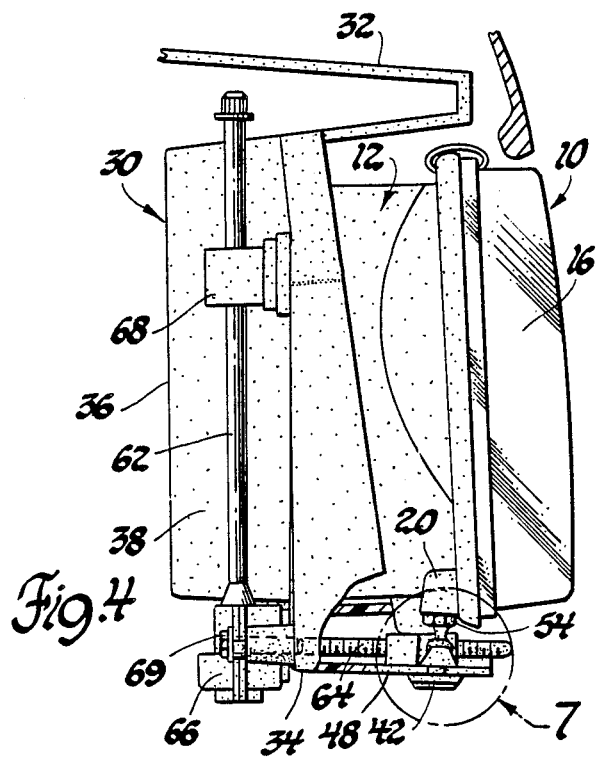
FIG. 4 is an end view taken along the plane indicated 4—4 in FIG. 1.

Referring now to FIGS. 1-3 of the drawings, the same illustrate an exemplary embodiment of the invention of the so-called styled headlamp variety for upscale automotive vehicle bodies. Such assembly includes a headlamp body 10, comprised of an elongated, dish-like, multiple cavity reflector member 12, the cavities of which may be separated by a web or webs 14, and the open front face of which is covered by a glass or like material lens element 16. As viewed best in FIG. 3, the reflector member 12 may be molded of a suitable polymer, particularly to include a variety of thickened portions for provision of mounting details as will be described. Such thickened portions include a region 18 at the lower margin of the reflector adjacent web 14, and similar such regions 20, FIG. 4, at opposite lateral ends of the reflector member. Reverting to FIG. 3, another thickened flange area 22 is provided above the web 14. Suitable grooving or channeling, as at 24, is provided around the entire margin of the open face of the reflector to receive the flange like margins of the lens 16. An adhesive and sealant such as butyl may be added at the inner face of the lens flange to prevent the ingress of foreign material and the lens is retained on the reflector member 12 by such means as clips 26. Conventional lamp bulbs may be provided, as is well known, in each of the several reflector cavities for low beam, high beam or parking lamp illumination selected at the will of the driver.

As also seen in FIGS. 1-3 the lamp includes a box-like support frame, generally designated as 30. This frame may also be fabricated of a polymer material molded to a shape, such as shown, preferably providing spaced horizontally extending upper and lower walls 32 and 34, respectively, joined by a back wall 36 and by opposite end walls 38 and 40. Frame 30 is suitably affixed to the front body structure, not shown, of the vehicle body by whatever conventional means desired.

Figure 7:
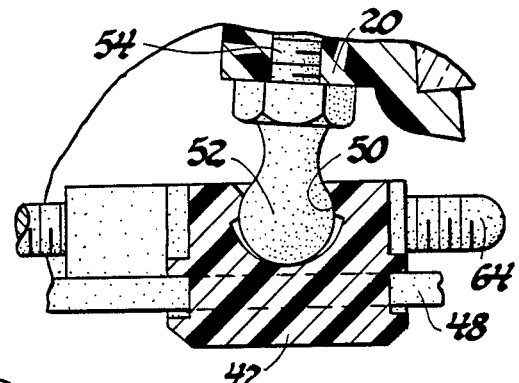
FIG. 7 is an enlarged view, partially in section, of a portion of FIG. 4.
Figure 6:
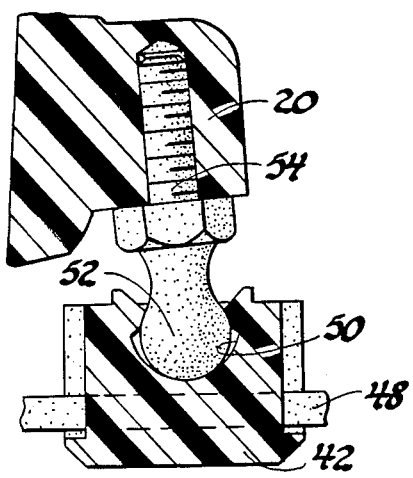
FIG. 6 is an enlarged sectional view taken along the plane indicated 6—6 in FIG. 1.

The lamp body 10 is in turn mounted on support frame 30 by a pair of slidable support shoes 42, seen best in detail in FIGS. 2, 6 and 7, as well as by an upper adjustable fastener 44. Fastener 44 is a threaded element having a head suitably tooled for reception of a hand adjusting device, such as a screwdriver, and having a threaded shank screwed into a thickened portion of the back wall 36 of the frame 30. The head portion of the fastener 44 has spaced shoulders 46 which capture the wall in region 22 of the reflector member 12. The fastener 44 is, in the illustrated case, accessible from the front of the vehicle and normally hidden, for example, by the lower marginal edge of the lip of the vehicle hood. It might alternatively be reversed for access from the rear, with the hood open and properly mounted to flange 22.

Referring to FIG. 2, and to FIGS. 6 and 7, the lower wall 34 of frame 30 is slotted at the end regions thereof as at 48 to receive the support shoes 42. Each support shoe 42 is of molded polymer with integral upper and lower portions embracing in the channel-like gaps therebetween the thickness of the slotted lower wall 34 at each location. The upper portion of each such support shoe 42 is molded with a socket-like recess 50 receiving ball head 52 of a ball stud 54 having a threaded shank screwed into each of the opposite thickened regions 20, respectively, of reflector member 12.

The two ball heads 52 of the ball studs are located in a horizontal plane of the support frame 30 and together through their centers define an instantaneous axis of rotation for aiming adjustment of the lamp body 10 in vertical planes. Such adjustment is of course effected by manipulated rotation of fastener 44 by a screwdriver or the like.

Aiming or adjustment of lamp body 10 in the horizontal planes, on the other hand, about a vertical axis is effected by manipulation of one of the shoes 42. The vertical axis for such horizontal adjustment is established by the shouldered head of upper fastener 44 and a lower pivot stud 56. Such pivot stud 56, seen best in FIG. 3, includes a threaded shank screwed into the thickened portion 18 of the reflector member and a bullet-shaped nose 58 which is pushed through a tapered aperture into a cavity of a polymeric molded pivot seat 60 secured to the lower wall 34 of the frame at a location vertically aligned with fastener 44 and proximate the horizontal axis through ball head 52. The nose 58 is simply held laterally for rotation in such pivot seat 60 such that, together with the head of upper fastener 44, it defines the vertical axis of headlamp adjustment while also being sufficiently close to the horizontal adjustment axis that it offers no impediment thereto.

Figure 5:
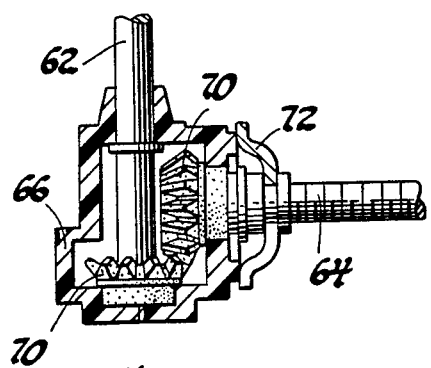
FIG. 5 is an enlarged sectional view taken along the plane indicated 5—5 in FIG. 1.

As earlier mentioned, support shoes 42 are slidable within slots 48 of frame 30 to provide for adjustment of the lamp body. The slots 48 may of course be aligned generally on circular arcs centered on the vertical axis through pivot seat 60, or on tangents thereto as might be accommodated by slight amounts of play, as between the shoes and the lower wall 34 of the frame, for example. Adjustment is effected by an angularly arranged adjustment apparatus, seen best in FIG. 4. The present exemplary embodiment illustrates one case of a desired orientation for the apparatus, including a pair of orthogonally arranged shafts 62 and 64 which are interconnected in a housing 66. The vertical shaft 62 has a head located adjacent the upper wall 32 of the support frame at a location easily manipulated by a hand screwdriver or the like, and arranged for rotation within a support clip 68 attached to back wall 36 of the frame. The lower end of shaft 62 extends into the gear housing 66 which is likewise suitably attached to the back wall as by screws 69. As seen best in FIG. 5, the lower end of shaft 62 has mounted thereto one of a pair of bevel gears 70 which are meshed and suitably journaled in circular recesses of the gear housing 66. The other of the bevel gears 70 is mounted at the internal end of the other shaft 64 and the gears are held in meshing engagement by means of a spring clip 72 inserted between a wall of the gear housing and a shoulder of shaft 64. As illustrated, the shaft 64 has the majority of its length threaded, and as seen best in FIG. 7, such threaded length of the shaft is engaged in a threaded bore of the upper portion of a shoe 42.

Thus, a selected rotation by a screwdriver or the like applied to the head of shaft 62 will cause rotation of the lower threaded shaft 64 within in its gear housing 66, resulting in a sliding adjustment of the engaged support shoe 42 and its opposite number fore or aft in their slots 48, so that the headlamp body 10 is adjusted or aimed relative to frame 30 about the vertical axis defined on the latter.

The embodiments of the invention in which an exclusive property or privilege is claimed are defined as follows:

1. A vehicle lamp assembly a comprising support frame formed with upper and lower walls and a back wall, a lamp body received between said frame walls, pivot means on said upper and lower frame walls and said lamp body aligned on a vertical axis about which said lamp body is adapted for rotatable adjustment relative to said frame, means defining a pair of guidance slots in said lower walls of said frame at opposite sides of said vertical axis and each generally aligned on an arc originating on said axis and contained in generally horizontal plane, a pair of support shoes slidably received in said slots to support the mass of said lamp body on said lower wall of said frame forsaid rotatable adjustment relative thereto about said vertical axis, means combined with each of said pair of support shoes for allowing rotatable adjustment of said lamp body about a horizontal axis, and adjustment means including a pair of angularly arranged rotatable shafts journaled on said frame and interconnected by bevel gears, one of said shafts being vertically orientated and having a head adjacent said upper wall of said frame at a location easily manipulated from above the lamp assembly, the other of said shafts being generally horizontally disposed and having thread means engaged with one of said shoes to effect adjustment of said lamp body about said vertical axis upon selected rotation of said head of said one of said shafts.

2. A vehicle headlamp assembly comprising a support frame with opposed upper and lower generally horizontal walls joined by a back wall, a lamp body received between said upper and lower frame walls, pivot means on said upper and lower frame walls and said lamp body aligned on a vertical axis about which said lamp body is adapted for rotatable adjustment relative to said frame, means defining a pair of guidance slots within and at opposite ends of the lower of said frame walls and each generally aligned on an arc originating on said vertical axis, a pair of support shoes on said lamp body slidably received in said slots to support the mass of said lamp body on said frame for said rotatable adjustment relative thereto, ball and socket means associated with each of said shoes defining a horizontal axis of rotatable adjustment of said lamp body about said frame, and adjustment means including a pair of angularly arranged generally vertically and horizontally disposed rotatable shafts journaled on said frame and interconnected by bevel gears, said vertically disposed rotatable shaft having a head adjacent said upper wall of said frame at a location easily manipulated from above the lamp assembly, said horizontally disposed one of said shafts having thread means engaged with one of said shoes to effect adjustment of said lamp about said vertical axis upon selected rotation of the head of said vertically disposed shaft.

* * * * *